United States Patent [19]

Nishimura et al.

[11] 4,404,506

[45] Sep. 13, 1983

[54] TOOL POSITION OFFSETTING SYSTEM FOR A SPARE TOOL

[75] Inventors: Hideo Nishimura, Aichi; Kuniyuki Niwa; Yasushi Yamamoto, both of Kariya; Takao Yoneda, Toyoake, all of Japan

[73] Assignee: Toyoda Koki Kabushiki Kaisha, Kariya, Japan

[21] Appl. No.: 330,667

[22] Filed: Dec. 14, 1981

[30] Foreign Application Priority Data

Dec. 16, 1980 [JP] Japan .................................. 55/178631

[51] Int. Cl.³ ............................................. G05B 13/00
[52] U.S. Cl. ....................................... 318/561; 29/568; 408/8; 318/572; 318/565
[58] Field of Search ............... 318/572, 561, 565, 563; 29/568; 408/8

[56] References Cited

U.S. PATENT DOCUMENTS

| | | | |
|---|---|---|---|
| 3,626,266 | 12/1971 | Sindelar et al. | 318/572 |
| 3,817,647 | 6/1974 | Lemelson | 408/8 |
| 4,185,376 | 1/1980 | Johnstone | 29/568 |
| 4,214,191 | 7/1980 | Watanabe et al. | 29/568 X |
| 4,246,557 | 1/1981 | Shima et al. | 318/572 X |
| 4,268,949 | 5/1981 | Sato | 29/568 |

Primary Examiner—B. Dobeck
Attorney, Agent, or Firm—Oblon, Fisher, Spivak, McClelland & Maier

[57] ABSTRACT

A tool position offsetting system for a spare tool, including a tool life detecting device provided for detecting a broken or substantially worn tool and for replacing the same by a spare tool, and a detecting device which detects whether the spare tool is inserted in the tool spindle. If the detecting device makes a detection, an input controlling circuit applies several signals to a numerical controller so as to instruct the same to introduce the dimensional data for the spare tool into the memory of the numerical controller, resulting in amending the offset data stored in the memory before a machining operation. After the machining operation, the input controlling circuit applies several signals so as to remove the dimensional data from the memory, resulting in restoring the tool offset data to its original setting.

6 Claims, 3 Drawing Figures

Fig. 3

| N001 | G00 | T21 | | |
|---|---|---|---|---|
| N002 | T22 | M06 | | |
| N003 | X-30000 | Y-35000 | S0160 | M03 |
| N004 | G43 | D21 | Z-15000 | M74 |
| N005 | G01 | Y-40000 | F0056 | M08 |
| N006 | G00 | Z 0 | M09 | |
| N007 | Y 0 | | | |
| N008 | M75 | | | |
| N009 | T23 | M06 | | |

TOOL POSITION OFFSETTING SYSTEM FOR A SPARE TOOL

BACKGROUND OF THE INVENTION

1. Field of the Invention

The present invention relates to a tool position offsetting system and more particularly to a tool position offsetting system for a spare tool which is used for the replacement of a broken or substantially worn tool.

2. Description of the Prior Art

In a conventional machine tool a measuring device is provided for detecting a broken or substantially worn tool and is capable of initiating an action which results in the replacement of the broken or substantially worn tool by directly replacing the same by a spare tool before the next operation is effected. Such a device is disclosed in U.S. Pat. Nos. 3,817,647 and 4,185,376. Further, in another conventional device such as disclosed in U.S. Pat. No. 3,626,266, offset storage means are provided for offsetting the tool position of a tool.

However, in such conventional devices, it is impossible to offset automatically the tool tip position of the spare tool, since the offset storage device is not available for a spare tool. Therefore, it has been required to preset exactly the spare tool at the beginning of the machining operation by the time consuming process of manual setting. Otherwise, the machining cycle must be suspended in order to input manually the tool offset data for a spare tool in the offset storage device when a broken or worn tool is replaced by the spare tool.

More particularly, in a conventional numerical controller, there is a memory having a plurality of memory areas, each of which stores tool offset data for a tool. When an NC program is fed into the numerical controller by a tape reader, one of the memory areas is designated by a D code in the NC program so that a desired tool offset data is read out therefrom for the tool position offsetting operation.

However, when a broken or worn tool is replaced by a spare tool, the D code designating the memory area is not automatically changed. Therefore, the tool offset data for the spare tool is not read out from the corresponding memory area and the tool position offsetting operation for the spare tool is not carried out. Accordingly, in the case that the position of a cutting tool tip of the spare tool does not precisely coincide with the position previously set in the NC program, the machining cycle must be stopped in order to input manually the tool offset data for the spare tool in the offset storage device.

SUMMARY OF THE INVENTION

It is therefore a primary object of the present invention to provide a new and improved tool position offsetting system which is capable of automatically replacing a broken or substantially worn tool by a spare tool of the same type and of automatically offsetting the tool position of the spare tool without suspending the machining cycle.

Another object of the present invention is to provide a new and improved tool position offsetting system as set forth above which is capable of amending the tool offset data of a broken or worn tool stored in a memory so as to offset automatically the tool position of the spare tool.

Still another object of the present invention is to provide a new and improved tool position offsetting system as set forth above which can be used with a conventional numerical controller without the need for reconstructing the same.

Briefly, according to the present invention, these and other objects are achieved by providing a tool position offsetting system for automatically replacing a broken or substantially worn tool by a spare tool of the same type and for automatically offsetting the tool position of the spare tool, including a numerically controlled machine tool having a tool spindle for inserting a tool therein; a numerical controller connected to the machine tool for controlling the machining operations thereof; and a memory provided, in the numerical controller for storing a tool offset data for the tool. The numerical controller is capable of offsetting the tool position of the tool in accordance with the tool offset data. The system further includes tool life detecting means connected to the numerical controller for detecting the end of the useful tool life of the tool to output a first signal; spare tool changing means connected to the numerical controller and the tool life detecting means for replacing the tool by a spare tool so as to insert the spare tool in the tool spindle in response to the first signal, which spare tool is the same type as the replaced tool; dimensional data setting means connected between the spare tool changing means and the numerical controller for setting the dimenisonal data for the spare tool, which dimensional data corresponds to the dimensional difference between the replaced tool and the spare tool; spare tool detecting means connected to the spare tool changing means for detecting whether a tool inserted in the tool spindle is the spare tool to output a second signal; input controlling means connected between the spare tool detecting means the numerical controller for effecting the introduction of the dimensional data for the spare tool to the memory in response to the second signal to thereby amend the tool offset data stored in the memory, whereby the numerical controller controls the machining operations in accordance with the amended tool offset data.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 3 shows an example of an NC program used in the tool position offsetting system according to the present invention.

DETAILED DESCRIPTION OF THE PREFERRED EMBODIMENT

Figure 1:
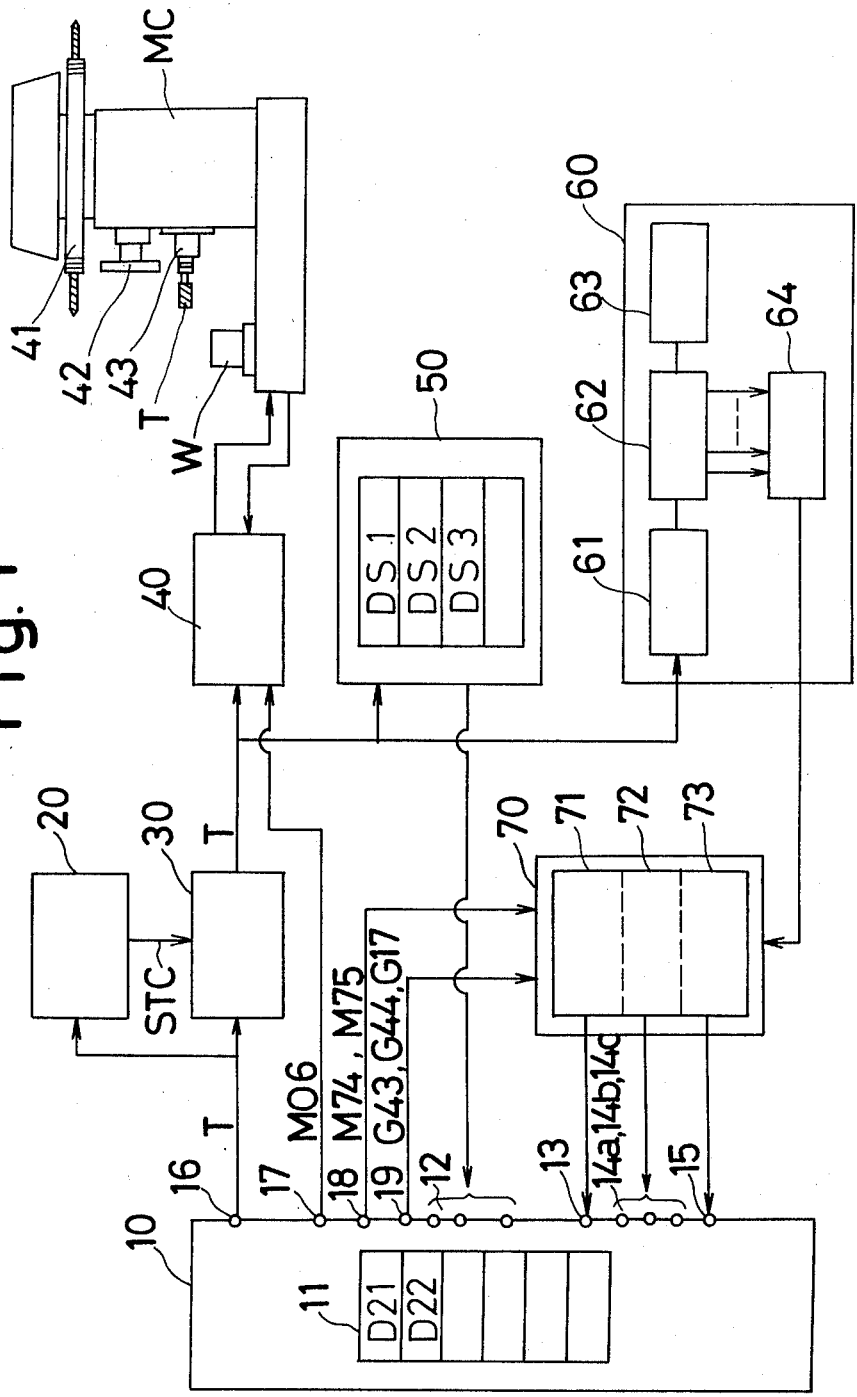
FIG. 1 is a block diagram illustrative of a tool position offsetting system according to the present invention.

Referring now to the drawings, wherein like reference numerals or characters refer to identical or corresponding parts throughout the several views, and more particularly to FIG. 1, there is shown a block diagram illustrating an automatic tool position offsetting system according to the present invention wherein the reference numerical 10 denotes a numerical controller performing tool position offsetting functions as well as general numerical control functions for controlling the movement of a tool T relative to a workpiece W by supplying command pulses to a numerically controlled machine tool MC. A memory 11 of the numerical controller 10 has a plurality of memory areas, each of which stores a tool offset data of a tool for offsetting the radius or length thereof, or otherwise a dimensional deviation thereof from a standard tool. Each memory area is designated by a D code such as D21 or D22 in an NC program punched in a tape, not shown. The numerical controller 10 includes several input terminals 12, 13, 14a, 14b, 14c and 15 and several output terminals 16, 17, 18 and 19. A tool life detecting device 20 is connected to the numerical controller 10 through the output terminal 16 so as to detect a broken or substantially worn tool or, in other words, detect whether the end of useful tool life. Such a tool may be detected by calculating the length of time when the tool is actually used for cutting or by sensing the rapid or continuous current changes caused by the break or wear of the tool. However, the tool life detecting device 20 may be some other tool breakage detecting systems. The tool life detecting device 20 generates and applies an output signal STC to a T code converting device 30 when it detects a broken or worn tool. The T code converting device 30 is connected to the numerical controller 10 and the tool life detecting device 20, and normally transmits a T code from the numerical controller 10 to a machine control device 40 connected thereto, wherein a T code is used to designate a tool. But, when the signal STC is applied from the tool life detecting device 20, the T code converting device 30 converts the T code, which designates a broken or worn tool, into another T code designating a spare tool of the same type as the broken or worn tool, and outputs the same to the machine control device 40. The machine control device 40 connected to the machine tool MC actuates relays or the like in accordance with miscellaneous function data such as M codes or T codes output from the numerical controller 10 and the T code converting device 30 so as to carry out sequential operations such as an indexing operation of a tool magazine 41 or withdrwing and inserting operations of a tool change arm 42, so that a desired tool designated by a T code is selected and inserted in a tool spindle 43.

A dimensional data setting device 50 is connected to the numerical controller 10 and the T code converting device 30 and provided with digital switches DS including DS1, DS2 and DS3, in each of which is set dimensional data with respect to a spare tool. The dimensional data for a spare tool corresponds to the dimensional deviation of the spare tool from the corresponding standard tool. For example, if the standard tool and the spare tool have the tool lengthes $P_1$ and $P_2$, respectively, the dimensional deviation $P_2-P_1$ is set in one of the digital switches DS. The dimensional data is selectively set to be plus or minus. The digital switch DS may be a thumb wheel switch. When a T code designating a spare tool is applied from the T code converting device 30, one of the digital switches DS corresponding to the spare tool opens its gate, not shown, so as to prepare for transferring the dimensional data stored therein to the memory 11 of the numerical controller 10. However, the dimensional data is not transferred until a strobe signal is applied to the input terminal 15 of the numerical controller 10 from a signal generating circuit 73, referred to later.

A detecting device 60 is connected to the T code converting device 30 and provided with first, second and third registers 61, 62 and 63 which are connected in series and a code detecting circuit 64. Each of the registers 61, 62 and 63 stores a T code at a time, and each time it is detected that a tool is to be inserted in the tool spindle 43, T codes stored in the first and second registers 61 and 62 are shifted to the second and third registers 62 and 63, respectively. In other words, the first register 61 stores the T code of a tool which is nextly to be inserted in the tool spindle 43, the second register 62 stores that being inserted therein and the third register 63 stores that being withdrawn therefrom. The code detecting circuit 64 is connected to the second register 62 so as to detect whether the T code stored therein designates a spare tool thereby to output a signal.

An input controlling circuit 70 is connected between the code detecting circuit 64 and the numerical controller 10 so as to control the introduction of the dimensional data stored in one of the digital switches DS to the memory 11. The input controlling circuit 70 includes an offset control circuit 71, a designating circuit 72 and a signal generating circuit 73. The signal generating circuit 73 outputs a strobe signal to the input terminal 15 in response to a signal from the code detecting circuit 64 so as to determine the time when the dimensional data stored in the digital switch DS is to be introduced to the memory 11. The offset control circuit 71 outputs high-level and low-level signals to the input terminal 13 so as to instruct the numerical controller 10 to substract and add the dimensional data from and to the memory 11, in cooperation with the strobe signal from the signal generating circuit 73. The designating circuit 72 is provided for outputting signals to the input terminals 14a, 14b and 14c so as to designate one or more axes to which the tool offset data stored in the memory area of the memory 11 is applied for the tool position offsetting operation.

In this embodiment, it is assumed that a spare tool is designated by one of T codes including T01 through T09 and that a standard tool is designated by one of T codes including T10 and the following codes. The code number of the T code is represented in BCD format, as shown in the following TABLE.

TABLE

| Code Number | Bits | | | | | | | |
|---|---|---|---|---|---|---|---|---|
| | 8th | 7th | 6th | 5th | 4th | 3rd | 2nd | 1st |
| Spare Tools | | | | | | | | |
| 01 | 0 | 0 | 0 | 0 | 0 | 0 | 0 | 1 |
| 02 | 0 | 0 | 0 | 0 | 0 | 0 | 1 | 0 |
| 03 | 0 | 0 | 0 | 0 | 0 | 0 | 1 | 1 |
| 04 | 0 | 0 | 0 | 0 | 0 | 1 | 0 | 0 |
| 05 | 0 | 0 | 0 | 0 | 0 | 1 | 0 | 1 |
| 06 | 0 | 0 | 0 | 0 | 0 | 1 | 1 | 0 |
| 07 | 0 | 0 | 0 | 0 | 0 | 1 | 1 | 1 |
| 08 | 0 | 0 | 0 | 0 | 1 | 0 | 0 | 0 |
| 09 | 0 | 0 | 0 | 0 | 1 | 0 | 0 | 1 |
| Standard Tools | | | | | | | | |
| 10 | 0 | 0 | 0 | 1 | 0 | 0 | 0 | 0 |
| 11 | 0 | 0 | 0 | 1 | 0 | 0 | 0 | 1 |
| , | , | , | , | , | , | , | , | , |
| , | , | , | , | , | , | , | , | , |
| 20 | 0 | 0 | 1 | 0 | 0 | 0 | 0 | 0 |
| , | , | , | , | , | , | , | , | , |
| , | , | , | , | , | , | , | , | , |

Figure 2:
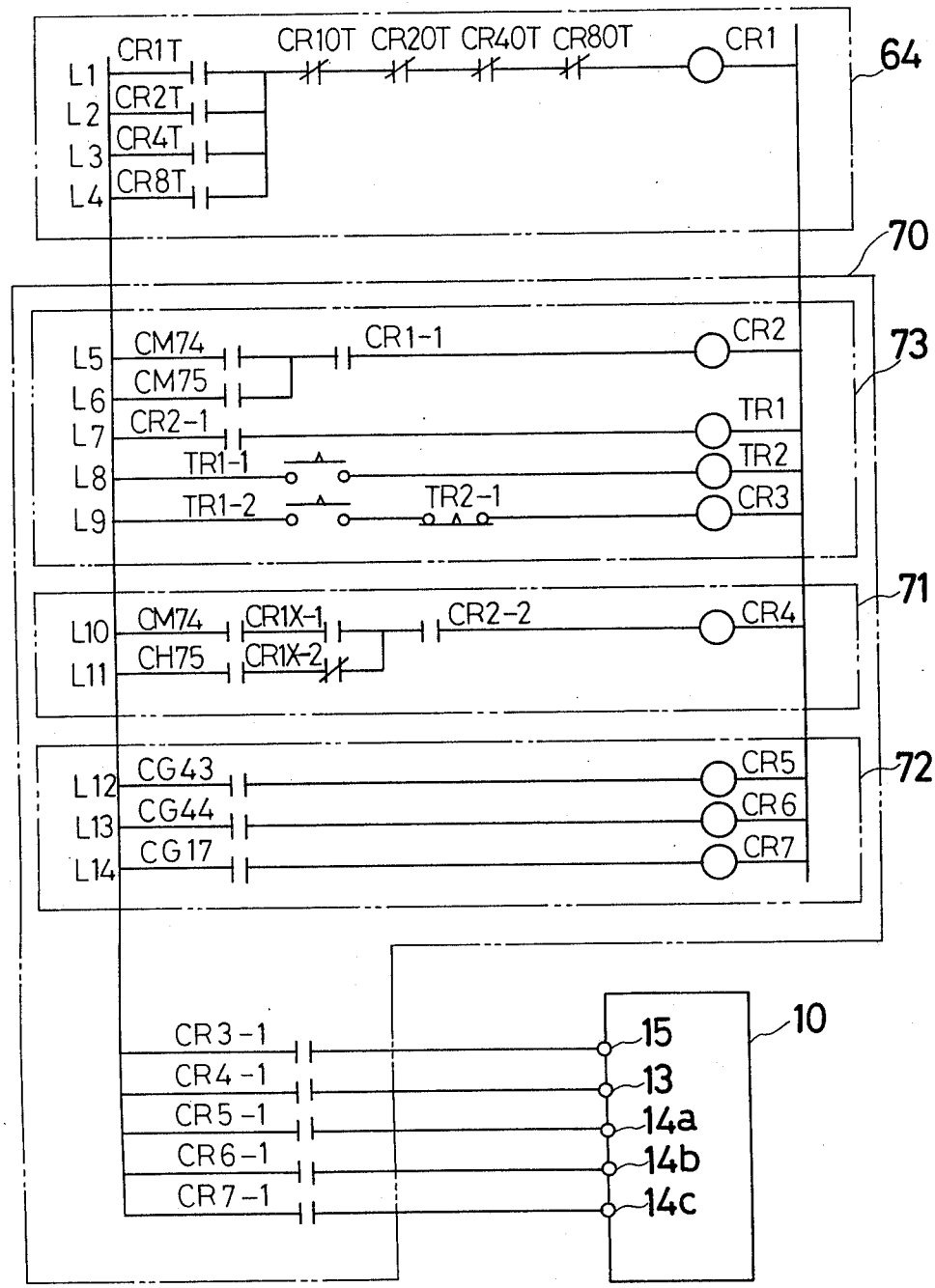
FIG. 2 shows relay circuits representing a detecting device and an input controlling circuit shown in FIG. 1.

In FIG. 2, the code detecting circuit 64 and the input controlling circuit 70 including the circuits 71, 72 and 73 are represented by relay circuits. The code detecting circuit 64 is composed of lines L1 to L4, wherein normally open contacts CR1T, CR2T, CR4T and CR8T respectively correspond to the first, second, third and fourth bits shown in the TABLE and normally closed contacts CR10T, CR20T, CR40T and CR80T respectively corresponds to the fifth, sixth, seventh and eighth bits shown in TABLE. Each of the normally open contacts CR1T, CR2T, CR4T and CR8T is closed when the corresponding bit has the digit 1, and each of the normally closed contacts CR10T, CR20T, CR40T and CR80T remains closed when the corresponding bit has the digit 0. Accordingly, it will be understood that a relay CR1 is energized only when one of the T codes T01 through T09 designating a spare tool is stored in the second register 62. For example, the T code T08 causes the contact CR8T to be closed thereby to energize the relay CR1.

The signal generating circuit 73 is composed of lines L5 to L9, wherein normally open contacts CM74 and CM75 are respectively closed when M codes M74 and M75 are applied thereto from the output terminal 18 of the numerical controller 10, and a normally open contact CR1-1 is closed with the energization of the relay CR1 of the code detecting circuit 64. Accordingly, a relay CR2 is energized when one of the contacts CM74 and CM75 is closed under the condition that the normally open contact CR1-1 is closed. M74 and M75 are M codes for controlling the introduction and removal of the dimensional data stored in the digital switch DS to and from the memory 11. The relay CR2, when energized, causes a normally open contact CR2-1 to be closed to energize thereby a time relay TR1. When the time relay TR1 is timed up, a normally open contact TR1-1 is closed to energize a time relay TR2. At the same time, a relay CR3 is energized, since a normally open contact TR1-2 is closed with the time-up operation of the time relay TR1 and a normally closed contact TR2-1 continues to be closed until the time relay TR2 is timed-up. Accordingly, the energization of the relay CR3 continued until the time relay TR2 is timed up, and causes a normally open contact CR3-1 to be closed to apply thereby the strobe signal to the input terminal 15 of numerical controller 10.

The offset control circuit 71 is composed of lines L10 and L11, wherein normally open contacts CM74 and CM75 are respectively closed when the M codes M74 and M75 are output from the output terminal 18 of the numerical controller 10, and normally open and closed contacts CR1X-1 and CR1X-2 are respectively closed when the dimensional data stored in the digital switches DS are minus and plus. Accordingly, under the condition that a normally open contact CR2-2 is closed along with the energization of the relay CR2, a relay CR4 is energized either if the M code M74 is output and the dimensional data is minus or if the M code M75 is output and the dimensional data is plus. The energization of the relay CR4 causes a normally open contact CR4-1 to be closed to apply thereby a high-level signal to the input terminal 13 of the numerical controller 10 connected to the contact CR4-1. However, when the relay CR4 is not energized, a low-level signal is applied to the input terminal 13. The numerical controller 10, in response to the high-level and low-level signals applied to the input terminal 13, respectively operates to subtract and to add the dimensional data stored in the digital switch DS from and to the tool offset data stored in the memory area of the memory 11 at the time when the strobe signal from the contact CR3-1 of the signal generating circut 73 is applied to the input terminal 15 of the numerical controller 10.

The designating circuit 72 is composed of lines L12 to L14, wherein normally open contacts CG43, CG44 and CG17 are respectively closed when G codes G43, G44 and G17, referred to later are output from the output terminal 19 of the numerical controller 10. Accordingly, when the G codes G43, G44 and G17 are output, relays CR5, CR6 and CR7 are energized, respectively. The energization of the relays CR5, CR6 and CR7 causes normally open contacts CR5-1, CR6-1 and CR7-1 to be closed thereby to apply signals to the input terminals 14a, 14b and 14c of the numerical controller 10, respectively. G43 and G44 are the G codes for instructing a tool length offsetting operation to increase and to decrease the stroke along the tool axis direction by the amount corresponding to the tool offset data stored in the memory 11, respectively. Accordingly, for example, the depth of a drilling operation is adjusted in response to the G codes G43 and G44. Similarly, G17 is the G code for instructing a tool radius offsetting operation to offset the radius of a tool in accordance with the tool offset data stored in the memory 11. The G code G17 may be used when a circular arc is machined by an end mill.

The operation of the automatic tool position offsetting system according to the present invention will be explained hereinafter, following an example of an NC program shown in FIG. 3, wherein the numerical controller 10 controls formation of a groove on the workpiece W by an end mill, not shown. It is assumed that necessary tools and spare tools are already prepared in the tool magazine 41, the tool offset data for the tools are stored in the memory 11 and the dimensional data for the spare tools are set in the digital switches DS.

At first, a normal operation wherein a spare tool is not used will be explained and then, at the latter part, the case wherein the spare tool is used will be explained. A tool designated by a T code such as T10 is hereinafter referred to as a tool T10, for example.

When the numerical controller 10 reads a first block N001 G00 T21 of the NC program through a tape reader, not shown, it applies the T code T21, which designates the end mill, to the tool life detecting device 20 and the T code converting device 30. G00 is the G code for instructing a positioning operation of a tool. If the tool life detecting device 20 does not detect that the tool T21 is broken or substantially worn, the T code converting device 30 transmits the T code T21 from the numerical controller 10 to the machine control device 40. The machine control device 40, in response to the T code T21, operates to index the tool magazine 41 so as to move the tool T21 to a tool change position, not shown, and to make ready for a next tool change operation. Simultaneously, the T code T21 is applied to the detecting device 60 and stored in the first register 61.

Subsequently, when the numerical controller 10 reads the next block N002 T22 M06, the M code M06 for instructing the tool change operation is applied from the output terminal 17 to the machine control device 40 thereby to actuate the tool change arm 42 for inserting the tool T21 in the tool spindle 43. When the tool T21 is detected to be inserted in the tool spindle 43 in a well-known manner, the T code T21 stored in the first register 61 is shifted to the second register 62. Then, the code detecting circuit 64 checks whether the T code T21 designates a spare tool or, in other words, determines whether the tool T21 inserted in the tool spindle 43 is a spare tool. In this case, since the T code T21 opens the normally closed contact CR20T in line L1, the relay CR1 is not energized, so that it is detected that the tool T21 is not a spare tool. As a result, any of the relays CR2, CR3 and CR4 of the input controlling circuit 70 are not energized and no signals are applied to the input terminals 13 and 15. Therefore, the dimensional data is not introduced to the memory 11, and the offset data stored in the memory 11 is not amended. After the tool change operation is completed, the numerical controller 10 outputs the T code T22 of the second block N002 to the tool life detecting device 20 and the T code converting device 30. If the signal STC is not output from the tool life detecting device 20, the T code T22 is applied to the machine control device 40, so that the tool T22 is indexed to the tool change position. The T code T22 is also applied to the first register 61 to be stored therein.

The following blocks N003, N004 and N005 are for machining operation to form a groove in the workpiece. Specifically, when the numerical controller 10 reads the third block N003 X-30000 Y-35000 S0160 M03, the tool T21 inserted in the tool spindle 43 is moved to a position defined by X30000 Y-35000, while rotating at a speed defined by S0160 in a rotational direction defined by M03 in a well-known manner.

In the next block N004, G43 D21 Z-15000 M74, G43 is the code for instructing the tool length offsetting operation to correct the stroke of a tool in the Z-axis or tool axis direction in accordance with the tool offset data which is stored in the memory area designated by a D code, and M74 is the code for controlling the introduction of the dimensional data stored in the digital switch DS to the memory area designated by the D code. In response to the G code G43, the relay CR5 of the designating circuit 72 shown in FIG. 2 is energized thereby to close the contact CR5-1. As a result, the signal is applied to the input terminal 14a to designate the Z-axis, so that the numerical controller 10 carrys out the tool length offseting operation in accordance with the tool offset data stored in the memory area D21 designated by the D code D21. Therefore, in accordance with the block N004, the tool length of the tool T21 is offset in the amount corresponding to the tool offset data stored in the memory area D21, and the tool T21 is moved in the tool axis direction to a position defined by Z-15000. In this case, since the relay CR1 of the code detecting circuit 64 is not energized, any relays CR2, CR3 and CR4 are not energized. Therefore, even though the contact C74 is closed in response to the M code M74, the dimensional data set in the digital switch DS is not introduced to the memory 11.

In accordance with the next block N005 G01 Y-40000 F0056 M08, wherein G01 is the G code for instructing the straight cutting operation of a tool, the tool T21 inserted in the tool spindle 43 is moved to a position defined by Y-40000 at a feed rate defined by F0056 with cutting fluid being supplied as instructed by the M code M08, resulting in forming a groove in the workpiece W. After the completion of the machining operation, the next block N006 G00 Z 0 M09 is read, so that the supply of the cutting fluid is stopped as instructed by the M code M09 and the tool T21 is moved to a position defined by Z 0. Then, in accordance with the next block N007 Y 0, the tool T21 is moved to a position defined by Y 0.

The M code M75 in the next block N008 is for instructing the cancellation or removal of the dimensional data set in the digital switch DS from the memory 11. In this case, however, the M code M75 has no effect, since a spare tool is not used and the relay CR1 and the related relays CR2, CR3 and CR4 are not energized. When the numerical controller 10 reads the next block N009 T23 M06, the tool T22 is inserted in the tool spindle 43 and the tool T23 is indexed to the tool change position, if the signal STC is not output. After that, the code T22 is shifted from the first register 61 to the second register 62 and the code T21 of the first block N001 is shifted from the second register 62 to the third register 63. The third register 63 may be utilized for determining a tool socket of the tool magazine 41 to which a tool is returned back. The following blocks and the corresponding machining operations are omitted. However, it will be understood that the machining operations according to the NC program are carried out in a well-known manner.

The case where a spare tool is used will be explained hereinafter. After a number of workpieces are machined, tool wear inevitably occurs or a tool may be broken.

When the first block N001 is read and the tool life detecting device 20 detects that the useful tool life of the tool T21 has ended, the signal STC is applied to the T code converting device 30. Then, the T code converting device 30 outputs a T code T01 which designates a spare tool of the same type as the tool T21. When the T code is output, the machine control device 40 performs a sequence operation for placing the spare tool T01 in the tool change position of the tool magazine 41, the dimensional data setting device 50 opens the gate of the digital switch DS1 in which the dimensional data for the spare tool T01 is set, and the detecting device 60 stores the T code T01 in the first register 61. However, the dimensional data set in the digital switch DS1 is not introduced to the memory 11, until the signal from the signal generating circuit 73 is applied to the input terminal 15. Then, in accordance with the block N002, the tool change operation is carried out so as to insert the spare tool T01 in the tool spindle 43, and the T code T01 stored in the first register 61 is shifted to the second register 62. In the code detecting circuit 64 connected to the second register 62, the T code T01 causes the contacts CR1T to be closed, resulting in energizing the relay CR1. Accordingly, it is detected that a spare tool is inserted in the tool spindle 43.

As aforementioned, in response to the third block N003, the spare tool T01 is moved to the position defined by X-30000 Y-35000. After that, when the fourth block N004 is read, the numerical controller 10 applies the M code M74 to the input controlling circuit 70 including the circuits 71, 72 and 73. In the signal generating circuit 73, the M code M74 causes the contact CM74 to be closed thereby to energize the relay CR2, because the contact CR-1 is already closed along with the energization of the relay CR1. As a result, after a time interval set by the time relay TR1, the relay CR3 is energized from the time when the time relay TR1 is timed-up until the time relay TR2 is timed-up, so that the strobe signal is applied to the input terminal 15. The interval is provided for preventing the numerical controller 10 from performing a wrong operation due to the delay in response to various signals. In the offset control circuit 71, if the dimensional data stored in the digital switch DS1 is plus, the relay CR4 is not energized, because the contact CR1X-1 is opened. Therefore, the low-level signal is applied to the input terminal 13 of the numerical controller 10, so that the tool offset data stored in the memory area D21 is amended by addition of the dimensional data set in the digital switch DS1 to the tool offset data, at the time when the strobe signal from the signal generating circuit 73 is applied to the input terminal 15. To the contrary, if the dimensional data stored in the digital switch DS1 is minus, the relay CR4 is energized, because the contacts CM74, CR1X-1 and CR2-2 are all closed in this stage. Accordingly, the high-level signal is applied to the input terminal 13, so that the tool offset data stored in the memory area D21 is amended by subtraction of the dimensional data set in the digital switch DS1 therefrom, at the time when the strobe signal from the signal generating circuit 73 is applied to the input terminal 15.

In the designating circuit 72, in response to the G code G43 in the fourth block N004, the relay CR5 is closed, so that the signal is applied to the input terminal 14a. Accordingly, the numerical controller 10, in response to the signal, operates to increase the stroke along the Z-axis or tool axis direction by the amount corresponding to the tool offset data stored in the memory area D21. It should be noted that, at this stage, the tool offset data stored in the memory area D21 is not an original one but is amended, by the introduction of the dimensional data, to be suitable for the spare tool T01. Therefore, the numerical controller 10 carries out the tool position offsetting operation for the spare tool T01.

In response to the following blocks N005, N006 and N007, the machining operation and the positioning operation of the spare tool T01 are carried out. Subsequently, when the next block N008 M75 is read, the M code M75 is applied to the input controlling circuit 70, and the contacts CM75 in lines L6 and L11 are closed, so that the relay CR2 is energized and then the relay CR3 is energized. If the dimensional data stored in the digital switch DS1 is plus, the relay CR4 is also energized, resulting in applying the high-level signal to the input terminal 13 thereby to subtract the dimensional data stored in the digital switch DS1 from the tool offset data stored in the memory area D21. It is to be noted that, at this stage, the tool offset data is restored to its original setting. To the contrary, if the dimensional data is minus, the relay CR4 is not energized, so that the dimensional is added to the tool offset data. Accordingly, when the M code M75 is read, the dimensional data, which was introduced to the memory area D21 in response to the M code M74, is removed from the memory area D21 thereby to restore the tool offset data stored therein to its original setting.

The present invention is not limited to the offsetting operation for the tool length but other offsetting operations such as for a tool radius are attained. The automatic tool position offsetting operation for the tool radius of a spare tool is particularly desirable, because the radius can not be preset by a manual setting process.

The automatic tool position offsetting operation for the radius of a spare tool is carried out similarly to the above-mentioned operation. However, the blocks N004 and N005 are changed as follows, N004 G45 D22 Z . . . M74 and N005 G17 G02 X . . . Y . . . R . . . M08, wherein the G code G45 instructs the offsetting operation to alter the path of the tool center in accordance with a tool radius stored in the memory area D22, and the G code G02 instructs the machining operation of a circular arc in the X-Y plane instructed by the G code G17. When, for example, a spare tool T02 is used, the signal generating circuit 73 responds to the M code M74 to close the relay CR3 and to apply the strobe signal to the input terminal 15. As a result, the dimensional data set in the digital switch DS corresponding to the spare tool T02 is introduced to the memory area D22 so as to amend the tool radius stored therein. The designating circuit 72, in response to the G code G17, closes the contact CG17 thereby to energize the relay CR7. The energization of the relay CR7 causes the contact CR7-1 to be closed, resulting in applying a signal to the input terminal 14C. The numerical controller 10, in response to the signal, outputs the driving pulses in the X and Y axis directions in accordance with the amended tool radius stored in the memory area D22, thereby to carry out the offsetting operation of the tool radius of the spare tool.

As aforementioned, according to the present invention, the automatic tool position offsetting operation for a spare tool is attained with the provision of the dimensional data setting device 50, the detecting device 60 and the input controlling circuit 70. More particularly, when a tool is detected as broken or substantially worn and is replaced by a spare tool, the detecting device 60 detects whether the spare tool is inserted in the tool spindle 43. Then, if it is detected, the input controlling circuit 70 applies the signals to the numerical controller 10 so as to instruct the same to introduce the dimensional data for the spare tool into the memory 11 of the numerical controller 10, so that the tool offset data stored in the memory 11 is amended before the machining operation. After the machining operation, the input controlling circuit 70 applies the signals to the numerical controller 10 so as to instruct the same to restore the tool offset data stored in the memory 11 to its original setting.

The designating circuit 72 of the input controlling circuit 70 may not be necessary if the numerical controller to be used has the function to designate the axis to which a tool offset data is to be applied. In other words, if a numerical controller, when reading the block N004 G43 D21 Z-15000 M74, can automatically perform the tool length offsetting operation in accordance with the tool offset data without the need for the designation of the Z axis by an external device, the designating circuit 72 is not necessary to carry out the tool position offsetting operation.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool position offsetting system comprising:
    a numerically controlled machine tool having a tool spindle for inserting a tool therein;
    a numerical controller connected to said machine tool for controlling machining operations of said machine tool;
    a memory provided in said numerical controller for storing tool offset data for said tool;
    said numerical controller being capable of offsetting the tool position of said tool in accordance with said tool offset data;
    tool life detecting means connected to said numerical controller for detecting the end of the useful tool life of said tool and based thereon to output a first signal;

spare tool changing means connected to said numerical controller and said tool life detecting means for replacing said tool by a spare tool so as to insert said spare tool in said tool spindle in response to said first signal, said spare tool being the same type as the replaced tool;

dimensional data setting means connected between said spare tool changing means and said numerical controller for setting the dimensional data for said spare tool, said dimensional data corresponding to the dimensional difference between said replaced tool and said spare tool;

spare tool detecting means connected to said spare tool changing means for detecting whether a tool inserted in said tool spindle is said spare tool to output a second signal;

input controlling means connected between said spare tool detecting means and said numerical controller for effecting the introduction of the dimensional data for said spare tool to said memory in response to said second signal thereby to amend said tool offset data stored in said memory, whereby said numerical controller controls the machining operations in accordance with said amended tool offset data.

2. A tool position offsetting system as set forth in claim 1, wherein said input controlling means comprises:
a signal generating circuit for generating a third signal in response to said second signal; and
an offset control circuit responsive to said third signal for instructing the introduction of said dimensional data to said memory before the machining operation by said spare tool and for instructing the removal of said dimensional data from said memory after the machining operation by said spare tool.

3. A tool position offsetting system as set forth in claim 2, wherein said spare tool changing means comprises:
a code converting device for converting a first code designating said tool into a second code designating said spare tool when said first signal is applied thereto; and
a machine control device for operating said machine tool so as to insert said spare tool instead of said replaced tool in said tool spindle in response to said second code applied thereto from said code converting device.

4. A tool position offsetting system as set forth in claim 3, wherein said spare tool detecting means comprising:
a first register for storing a code designating said tool or said spare tool which is to be inserted in the tool spindle;
a second register for storing a code designating said replaced tool or said spare tool which is being inserted in said tool spindle; and
a code detecting circuit for detecting whether the code stored in said second register is that of said spare tool to output said second signal.

5. A tool position offsetting system as set forth in claim 4, wherein said dimensional data setting means comprises a digital switch which stores the dimensional data for said spare tool.

6. A tool position offsetting system as set forth in claim 5, wherein said digital switch is a thumb wheel switch.

* * * * *